US011295194B2

(12) United States Patent
Romero

(10) Patent No.: US 11,295,194 B2
(45) Date of Patent: Apr. 5, 2022

(54) NATURAL LANGUAGE PLATFORM FOR DATABASE SYSTEM

(71) Applicant: salesforce.com, inc., San Francisco, CA (US)

(72) Inventor: Eric Romero, Walnut Creek, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 276 days.

(21) Appl. No.: 16/527,384

(22) Filed: Jul. 31, 2019

(65) Prior Publication Data

US 2019/0354831 A1 Nov. 21, 2019

Related U.S. Application Data

(63) Continuation of application No. 15/353,834, filed on Nov. 17, 2016, now Pat. No. 10,410,107.

(60) Provisional application No. 62/366,749, filed on Jul. 26, 2016.

(51) Int. Cl.
| | | |
|---|---|---|
| *G06F 7/00* | (2006.01) | |
| *G06F 16/00* | (2019.01) | |
| *G06N 3/00* | (2006.01) | |
| *G06F 21/31* | (2013.01) | |
| *G06F 16/2452* | (2019.01) | |
| *G06F 21/32* | (2013.01) | |

(52) U.S. Cl.
CPC ....... *G06N 3/006* (2013.01); *G06F 16/24522* (2019.01); *G06F 21/31* (2013.01); *G06F 21/32* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS

"Google Plus Users", Google+Ripples; Oct. 31, 2011; 3 pages.

*Primary Examiner* — Tuan A Pham
(74) *Attorney, Agent, or Firm* — Schwabe Williamson & Wyatt

(57) ABSTRACT

An artificial intelligence assistant ("chatbot") operates within a multi-tenant database and allows users to interact with the underlying structured database through a natural language interface without using a standard structured query language or database interface. Users may interact with the chatbot via a chatroom and perform database queries using natural language expressions in the same manner as asking a person to perform the tasks. In addition, the chatbot may check user permissions and security parameters to determine if the user is permitted to access or alter data within the multi-tenant database.

23 Claims, 7 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,788,263 B1 | 7/2014 | Richfield |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0086482 A1* | 4/2008 | Weissman .......... G06F 21/6218 |

(56) References Cited

U.S. PATENT DOCUMENTS

| | | |
|---|---|---|
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0228922 A1 | 9/2011 | Dhara |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0276142 A1* | 10/2013 | Peddada ................. G06F 21/62 726/28 |
| 2014/0101259 A1 | 4/2014 | Barone |
| 2014/0195252 A1 | 7/2014 | Gruber |
| 2014/0359537 A1 | 12/2014 | Jackobson et al. |
| 2016/0125371 A1* | 5/2016 | Grassadonia .......... G06Q 20/34 705/44 |
| 2017/0200084 A1 | 7/2017 | de Aguiar |

* cited by examiner

NATURAL LANGUAGE PLATFORM FOR DATABASE SYSTEM

The present application is a continuation of U.S. patent application Ser. No. 15/353,834 filed Nov. 17, 2016, which claims priority to U.S. Provisional Patent Application Ser. No. 62/366,749 filed on Jul. 26, 2016, entitled: CHATBOT FOR INTERFACING WITH MULTI-TENANT DATABASES which are all incorporated by reference in their entireties.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology relates to a natural language platform for a database system.

BACKGROUND

A user may not know how to interface with a database system. For example, the user may be non-technical, have an incomplete or missing database view, or be unfamiliar with the database schema. Even technical users may be reluctant to access databases when information needs to be accessed quickly, the user is unsure of the exact database syntax, or the information for basing a database query is incorrect.

The database user may make assumptions based upon requested information, leading to undesired information or wasting time in back-and-forth information gathering. For example, a software project manager may want to know how many open bugs are left for a next software release. The project manager may access a dashboard that shows all open bugs but may not know how to filter the results to only display open bugs for a next software release.

In another example, a user is tasked with updating the phone number for a customer record in a company database. Unaware of the exact database schema, the user may update a home phone number instead of a mobile phone number or work phone number. In yet another example, an account executive asks an assistant how many orders were completed last year. An hour later the assistant presents all placed orders, but the executive specifically wanted orders that were placed and fulfilled.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
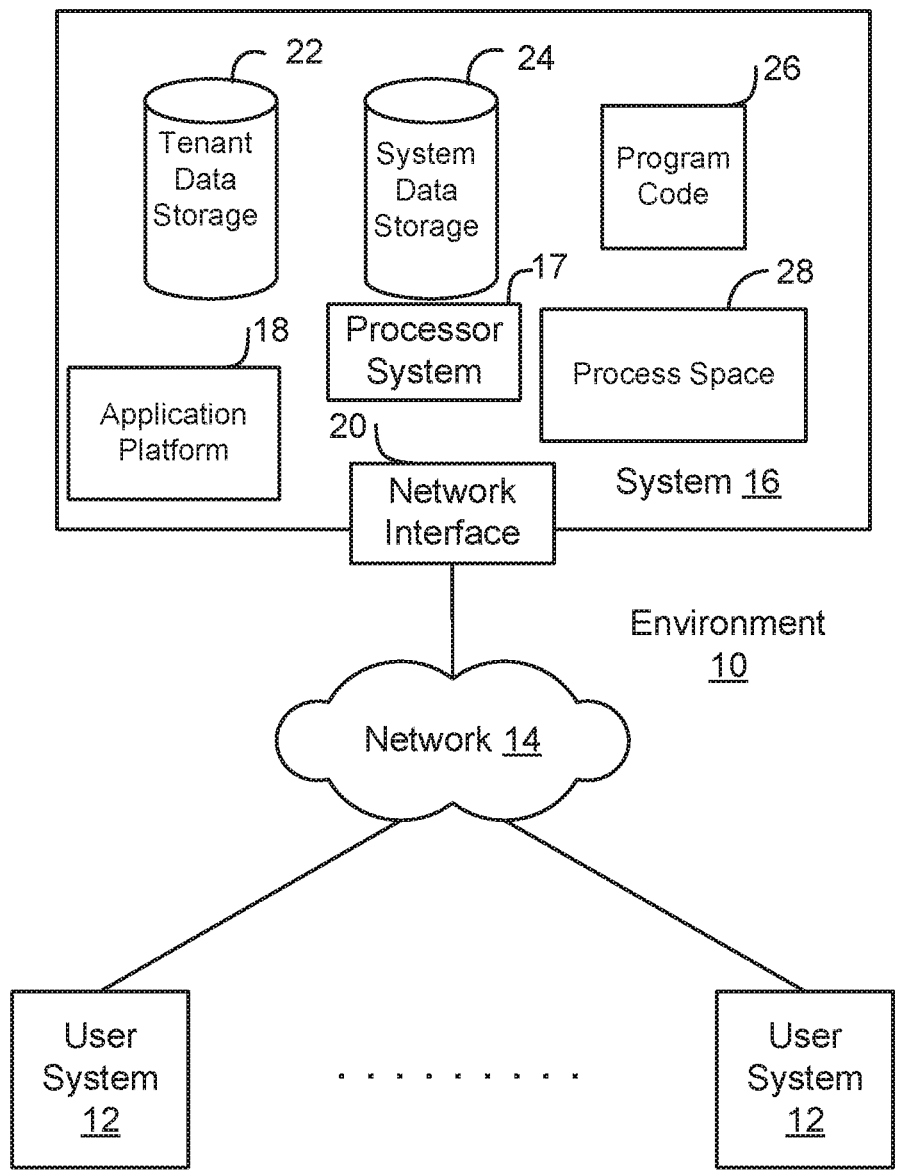
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
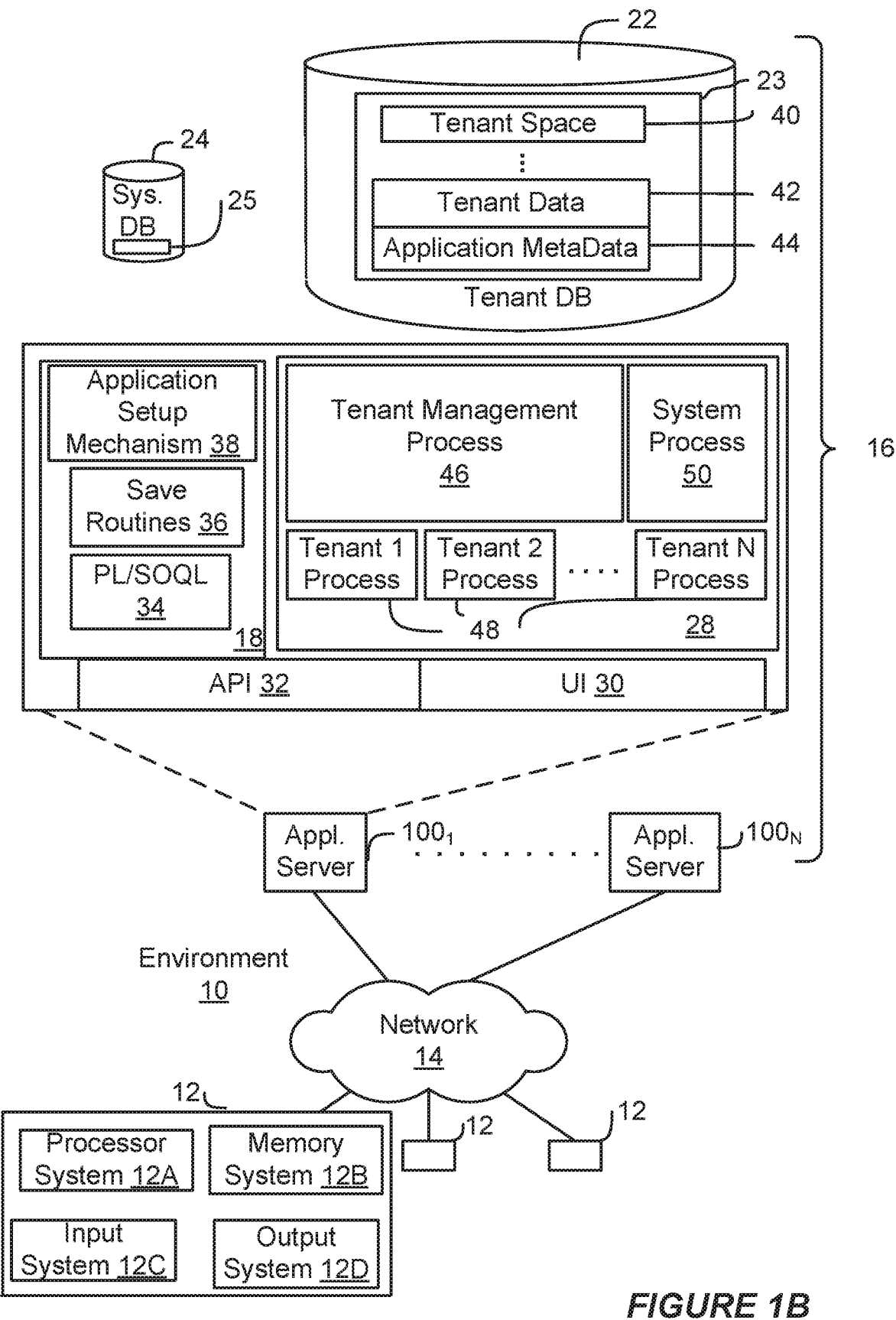
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG.

1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Natural Language Platform for Database System

A natural language processing platform is alternatively referred to as a chatbot. The chatbot accesses a multi-tenant database and uses metadata to identify datasets and fields within the multi-tenant database. The chatbot is a software program that receives a natural language user query, via direct messages or group chats, and may exist as a separate entity on a chat client. The chatbot may use natural language processing (NLP) to convert the natural language user query into a structured database query or action for accessing structured data in the multi-tenant database. The chatbot may generate a natural language response that includes results of the structured database query. If the natural language user query is insufficient for constructing a database query or action, the chatbot may ask the chatbot user for more information until a valid database query or action is determined.

Figure 2:
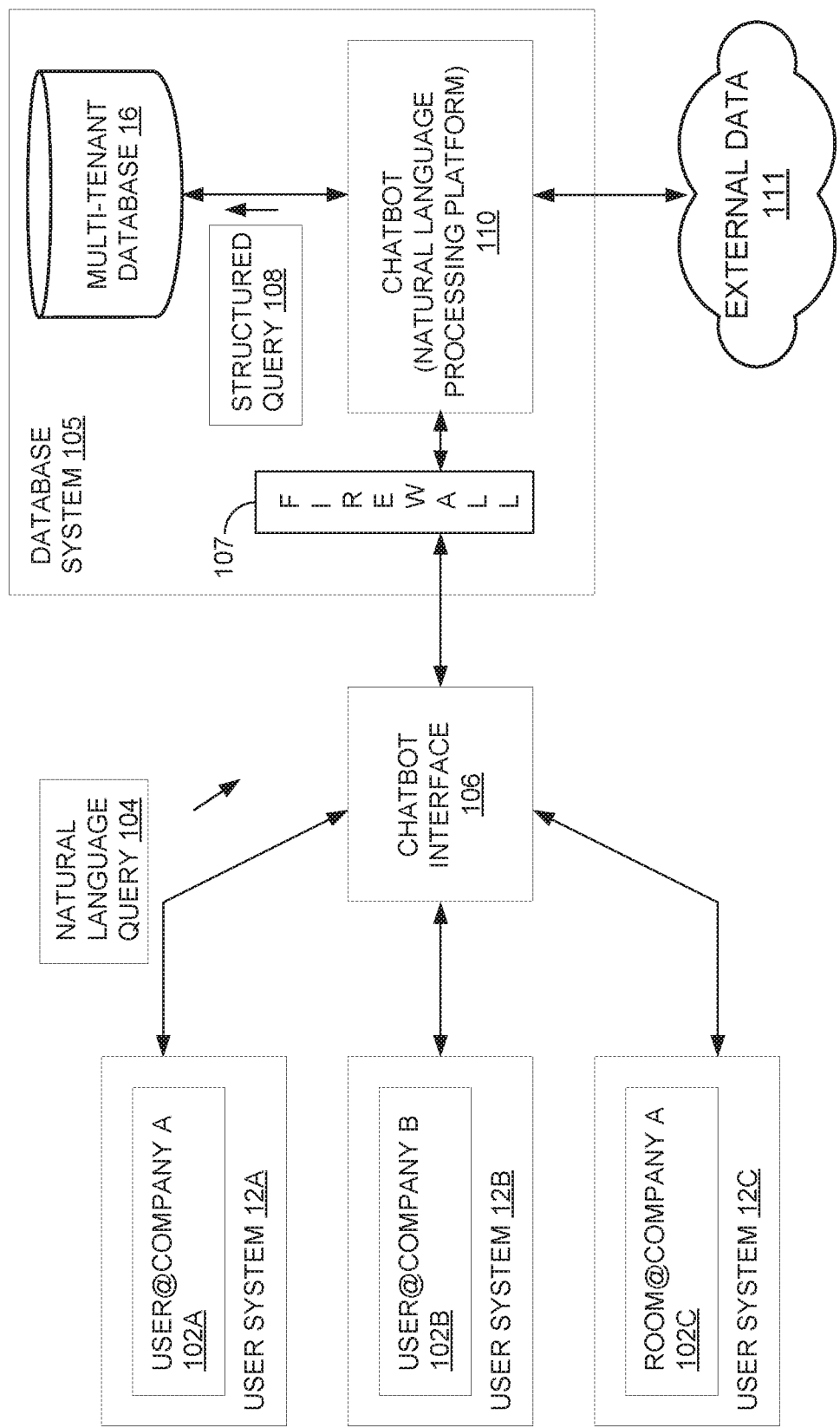
FIG. 2 shows an example natural language processing platform (chatbot) used in a multi-tenant database.

FIG. 2 shows an example natural language processing platform 110 operating as a chatbot within a database system 105. One or more user systems 12A-12C as described above may access a chatbot interface 106. Chatbot interface 106 may be any user interface operating on user systems 12 or on database system 105 that receives natural language search queries 104. Chatbot interface 106 may include software that operates in conjunction with a user interface used for accessing multi-tenant database 16 or accessing other external data 111. For example, chatbot interface 106 may include Facebook® messenger, Flake, Apple® Imessage, or any other software where a user chats or sends text messages. In one example, chatbot interface 106 may receive and send text or audio data forming natural language query 104.

Chatbot 110 converts natural language query 104 into a structured database query 108 for accessing structured data in multi-tenant database 16. Chatbot 110 also may access external data 111 based on query 104. For example, chatbot 110 may access a website 111 and provide additional information related to query 104. By converting natural language queries 104 into structured database queries 108, chatbot 110 enable users with little database knowledge to more easily and quickly locate structured data and information in multi-tenant database 16 and external data 111.

It should be understood that natural language queries 104 and the structured database queries 108 based on natural language queries 104 may include any type of query that reads, modifies, and/or writes data from or into multi-tenant database 16.

In one example, chatbot 110 operates behind a firewall 107 within the same servers as database system 105 and performs searches directly on multi-tenant database 16. By operating behind firewall 107, chatbot 110 may directly access user permissions and associated organization data in multi-tenant database 16 without going through application programming interfaces (APIs).

Users on user systems 12A-12C may have associated login addresses 102A-102C, respectively. Chatbot 110 may identify datasets within database 16 associated with the user login address 102 and generate structured database queries 108 that access the identified datasets. Thus, chatbot 108 not only converts natural language queries 104 into structured database queries 108 but also scopes the structured database queries to the datasets in multi-tenant database 16 associated with the user organization.

Figure 3:
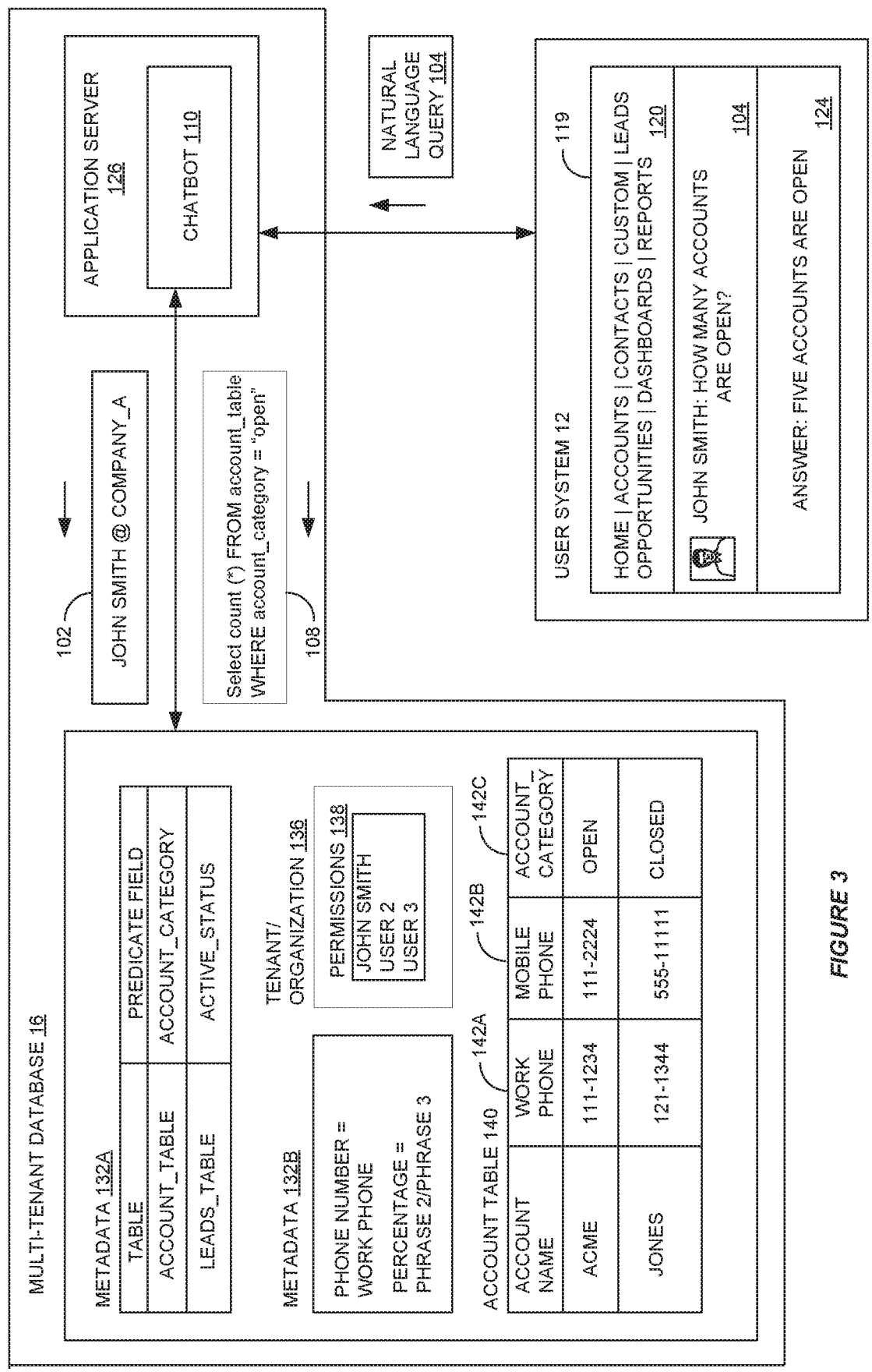
FIG. 3 shows how the chatbot operates within the multi-tenant database.

FIG. 3 shows an example of how the chatbot operates within the multi-tenant database. In one example, a customer relationship management (CRM) application may store accounts, contacts, custom records, leads, opportunities, dashboards, and other reports in database 16. A user interface 119 on user system 12 may display a list of the records and other objects 120 residing on database 16. Of course any type of application may store any type of data, dataset, record, object, field, etc. in database 16. Objects 120 may be stored as structured data in database 16, such as in tables 140 that include columns 142. In one example, data in database 16 is accessed using a structured query language (SQL).

A user may enter natural language query 104 into user interface 119. For example, a user John Smith may enter the natural language query "How many accounts are open?" User system 12 sends natural language query 104 to chatbot 110 in database system 16. Chatbot 110 may use a user id, domain (@company.com), or internet address (IP address)

102 received from the user to identify an associated tenant or organization 136 in database 16.

Tenant 136 may include a group of users who share common access with specific privileges to a software instance. The multi-tenant architecture of database 16 provides tenant 136 with a dedicated share of the software instance typically including one or more of tenant specific data, user management, tenant-specific functionality, configuration, customizations, non-functional properties, associated applications, etc. Multi-tenancy may contrast with multi-instance architectures, where separate software instances operate on behalf of different tenants. In one example, tenant 136 may be associated with an organization, such as company A.

Chatbot 110 uses address 102 to associate the user with a particular tenant 136 and organization. Database system 16 identifies user permissions 138, tables, records, objects, metadata, or any other datasets associated with tenant 136. For example, the datasets for a particular tenant 136 may have a same organization identifier.

Chatbot 110 converts natural language query 104 into a structured database query 108 based on permissions 138, datasets 140, and metadata 132 associated with the tenant/organization 136. Chatbot 110 receives data and/or information from database 16 responsive to structured database query 108 and converts the data into a natural language response 124. For example, chatbot 110 may generate the following transcript:

John Smith: How many accounts are open?
Chatbot: Five accounts are open.

Chatbot 110 may ask questions to clarify the database search. For example, the user may be a project manager (PM) that directs the following natural language query to chatbot 110 to produce the following transcript:

PM: Can you tell me how many open bugs are left?
Chatbot: Yes, would you like to know the count for all open bugs?
PM: No, just the ones for this release
Chatbot: There are 23 bugs with open status for release 8.0

Chatbot 110 also may identify user permissions and only display database query results when the user has sufficient authorization. For example, chatbot 110 may identify permissions 138 associated with user address 102 and only display results when permissions 138 provide sufficient authorization. An example of this interaction may produce the following transcript:

John: Can you tell me what the top 3 accounts are, based on volume?
Chatbot: I'm sorry I cannot do that, John. You do not have the authority to view that information.

Chatbot 110 also may clarify a natural language query and either read data from multi-tenant database 16, modify data in multi-tenant database 16, or write data to multi-tenant database 16 based on natural language query 104. For example, chatbot 110 may not be able to identify a field in table 140 that corresponds with the word "phone" used in natural language query 104. However, chatbot 110 may identify other similar fields 142A and 142B in table 140, such as "home_phone" "work_phone", and "mobile_phone." This interaction may produce the following transcript:

John: Can you update the phone number for Rick Jones to (555) 555-5555?
Chatbot: Would you like me to update Home Phone, Work Phone, or Mobile Phone?
User: Work phone
Chatbot: Done.

Chatbot 110 may have a personality to engage the user. If further information is needed, chatbot 110 may request it politely instead of curtly. Chatbot 110 may also provide suggestions based on a context of the query.

User: Who is our contact on the Acme account?
Chatbot: That would be Bill Johnson. Would you like his contact information?

If there is a problem accessing multi-tenant database 16, chatbot 110 may inform the user data is currently unavailable and include a description of the error.

User: How many crashes were reported for 7.0?
Chatbot: I'm sorry, that data is currently unavailable due to network issues. Please ask me again later As mentioned above, chatbot 110 may associate natural language queries 104 with specific tenants or organizations 136 within multi-tenant database 16. The subset of data chatbot 110 queries then may depend on the user and associated organization interacting with chatbot 110. For example, Query 1:
John Smith@company_A.com: How many accounts are open?
Chatbot: Right now, there are 40 Accounts that are open.
Query 2:
User_2@company_B.com: How many accounts are open?
Chatbot: I could not find data for Accounts. Did you mean Customers?

Different datasets may exist in database 16 for different organizations 136. For example, organization 136 associated with company_A may include an accounts table 140 that chatbot 110 accesses pursuant to query 1. However, a second organization 136 associated with company_B and user_2 in query 2 may not have an account table. Accordingly, chatbot 110 sends a message back to user_2 indicating no Accounts exist for the associated organization 136.

Chatbot 110 may consolidate data from database 16 with data from other databases.

RealEstateAgent: Show me the price of the property located at 123 Fig St in Walnut Creek, Calif.
Chatbot: The price of that property is $500,000. However, MLS shows that the status is SOLD.

Chatbot 110 may perform separate API calls to external databases, such as a website and combine the external data with any data retrieved from database 16.

Chatbot 110 may initiate some API calls based on previous queries requesting similar data. For example, chatbot 110 may frequently receive queries for the price of property followed by requests for the property sale status. Chatbot 110 may automatically initiate a separate multiple listing service (MLS) website search in response to the property price query and supply results of the MLS search in combination with the price data obtained from database 16.

Chatbot 110 may operate within group chat applications. If participants of the chat session have insufficient permissions, chatbot 110 may only send search results directly to the authorized search requester.

Query 1:
Sales person: Who is the Account Executive for the Acme Account?
Chatbot: The Account Executive is Jerry Jones.
Query 2:
Manager: What is the Sales Volume for that account?
Chatbot: I will tell you in a direct message.

In the first example, a sales person and a manager may communicate via a group chat application. The manager may have higher permissions 138 than the sales person. During the group chat session, the sales person may send query 1 to chatbot 110. The sales person and the manager both may have sufficient permissions 138 to view the account executive information for the Acme account. Accordingly, chatbot 110 may send the account executive name to both the sales person and the manager.

In the second example, only the manager may have sufficient permissions 138 to view the sales volume data for the Acme account. Accordingly, chatbot 110 may only send the sales volume data to the manager via a private direct message.

In another example, neither the sales person nor the manager may have sufficient permissions 138 to view requested data. Chatbot 110 then may send a natural language response to both the sales person and the manager indicating insufficient privileges for viewing the requested data.

Chatbot 110 may generate numerical responses:
User: What percentage of open bugs are on 7.0?
Chatbot: 34.5% of Open bugs belong to Version 7.0

Chatbot 110 may identify a math operator such as "percentage" in a portion of natural language query 104. Chatbot 110 then may generate structured query 108 that returns a mathematical result that identifies the number of open bugs associated with the 7.0 software release. Alternatively, chatbot 110 may perform the mathematical operation that divides the number of open bugs in the 7.0 software release by the total number of bugs in the 7.0 software release.

Metadata

Chatbot 110 may use metadata 132 to resolve ambiguities in natural language query 104. It should be understood that metadata 132 is distinguished from other metadata referred to above in FIGS. 1A and 1B and used by multi-tenant database 16 for different tenants 136.

Chatbot 110 may parse different portions of query 104 to first identify associated datasets. For example, user John Smith may send the following natural language query 104.
John Smith@company_A: How many accounts are open?

Chatbot 110 may identify the user and associated company associated with query 104 as described above to identify the associated datasets in database 16. For example, chatbot 110 may scope the data in multi-tenant database 16 belonging to company A and accessible by John Smith. In this example, chatbot 110 identifies account table 140 as part of the dataset associated with company A that John Smith has access permissions.

Chatbot 110 then may parse query 104 into three different phrases:
1. How many
2. accounts
3. are open?

Chatbot 110 may recognize the phrase "How many" as a record count. Chatbot 110 may recognize the second phrase "accounts" as a dataset or table 140 in database 16 to filter data upon. By using a natural language processor to recognize the singular form of words, and a simple matching algorithm, chatbot 110 may match the second phrase with account_table 140.

Chatbot 110 may identify the third phrase "are open" as a predicate for second phrase "accounts." Chatbot 110 may identify a table-predicate field relationship in metadata 132A between account table 140 and account category field 142C. Metadata 132A may direct chatbot 110 to filter the account_category in account table 140 per the "open" term in the third phrase. For instance, in terms of a SQL database, chatbot 110 may construct the following SQL command 108 from natural language query 104:
SELECT count(*) FROM account_table WHERE account_category="open"

Chatbot 110 may receive an integer response of 5 from database 16 in response to structured query 108. Chatbot 110 may convert the integer response into natural language response 124 with the answer "Five accounts are open." and send the answer to John Smith at user system 12.

In another example, a user may enter the natural language query:
How many leads are active?

Chatbot 110 again identifies keywords in a first phrase "How many" as associated with a record count. Chatbot 110 recognizes second phrase "leads" as a dataset in database 16 to filter data upon. Chatbot 110 identifies a third phrase "are active" as a predicate to the second "leads" phrase. Chatbot 110 determines from a second entry in metadata 132A that a predicate phrase associated with the leads table is mapped to an active status column. Accordingly, chatbot 110 generates a structured database query that filters the data in the leads table (not shown) upon "active" for "active status."
SELECT count(*) FROM leads_table WHERE active_status="active"

As also mentioned above, a user may enter an ambiguous query such as:
What is the Acme phone number?

Chatbot 110 may identify a work phone 142A and a mobile phone 142B for the Acme account in table 140 but no generic phone number. Chatbot 110 may query the user for more specific information regarding the phrase "phone number." Alternatively, metadata 132B may map different query keywords to a specific table columns. For example, metadata 132B may map the generic query phrase "phone number" to "work phone" in table 140. Accordingly, chatbot 110 may generate the response:
The Acme Work Phone number is 111-1234.

Metadata 132 may map any natural language query phrase to any structured data or a structured query operation. For example, metadata 132B may include a natural language keyword "percentage" that directs chatbot 110 to divide the value associated with a second phrase in the query by the value associated with a third phrase in the query.

Figure 4:
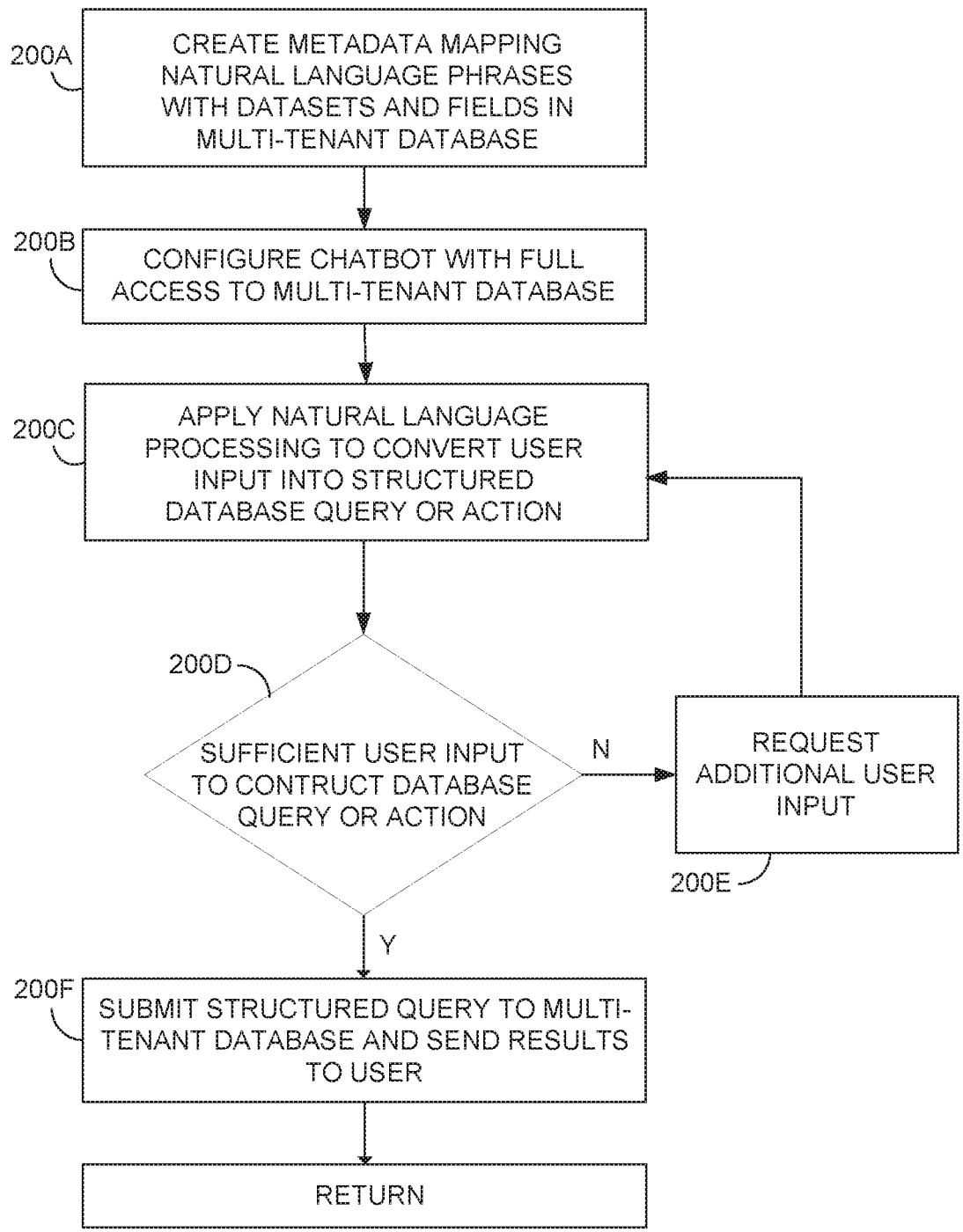
FIG. 4 shows an example process for the chatbot.

FIG. 4 shows an example chatbot process for generating structured database queries. In operation 200A, metadata is created and stored in the multi-tenant database. The metadata may associate different natural language phrases with datasets or fields associated with a particular organization in the multi-tenant database. As described above, the metadata also may associate different keywords and/or natural language sentence structures, such as predicates, with different tables, columns, datasets, or SQL functions.

Operation 200B configures the chatbot with full access to the multi-tenant database. For example, the chatbot may operate behind the database firewall and perform preliminary and primary structured database queries. The chatbot may confirm the natural language queries include sufficient information for conversion into structured database queries and confirm user authorization to view the results.

Operation 200C uses a natural language processor to convert the natural language query into a structured database query. For example, the chatbot may parse the natural language query to identify keywords and sentence structures for different phrases within the query.

Based on the natural language processing, the chatbot in operation 200D determines if the user query contains sufficient information to construct a structured database query. For example, the chatbot may perform a preliminary search to identify datasets in the multi-tenant database corresponding with the user query. If no matching datasets are found in operation 200D, the chatbot in operation 200E may ask the user for additional information. For example, the chatbot may send a natural language response notifying the user the requested data cannot be found. In another example, the chatbot may find several datasets that closely match the user query and ask the user if one of the identified datasets is correct.

The chatbot may update the user query with the additional user information in operation 200C. If the additional information is sufficient, the chatbot in operation 200D submits an updated structured database query to the multi-tenant database in operation 200F. The chatbot then may convert the query results into a natural language response and send the converted response to the user.

Figure 5:
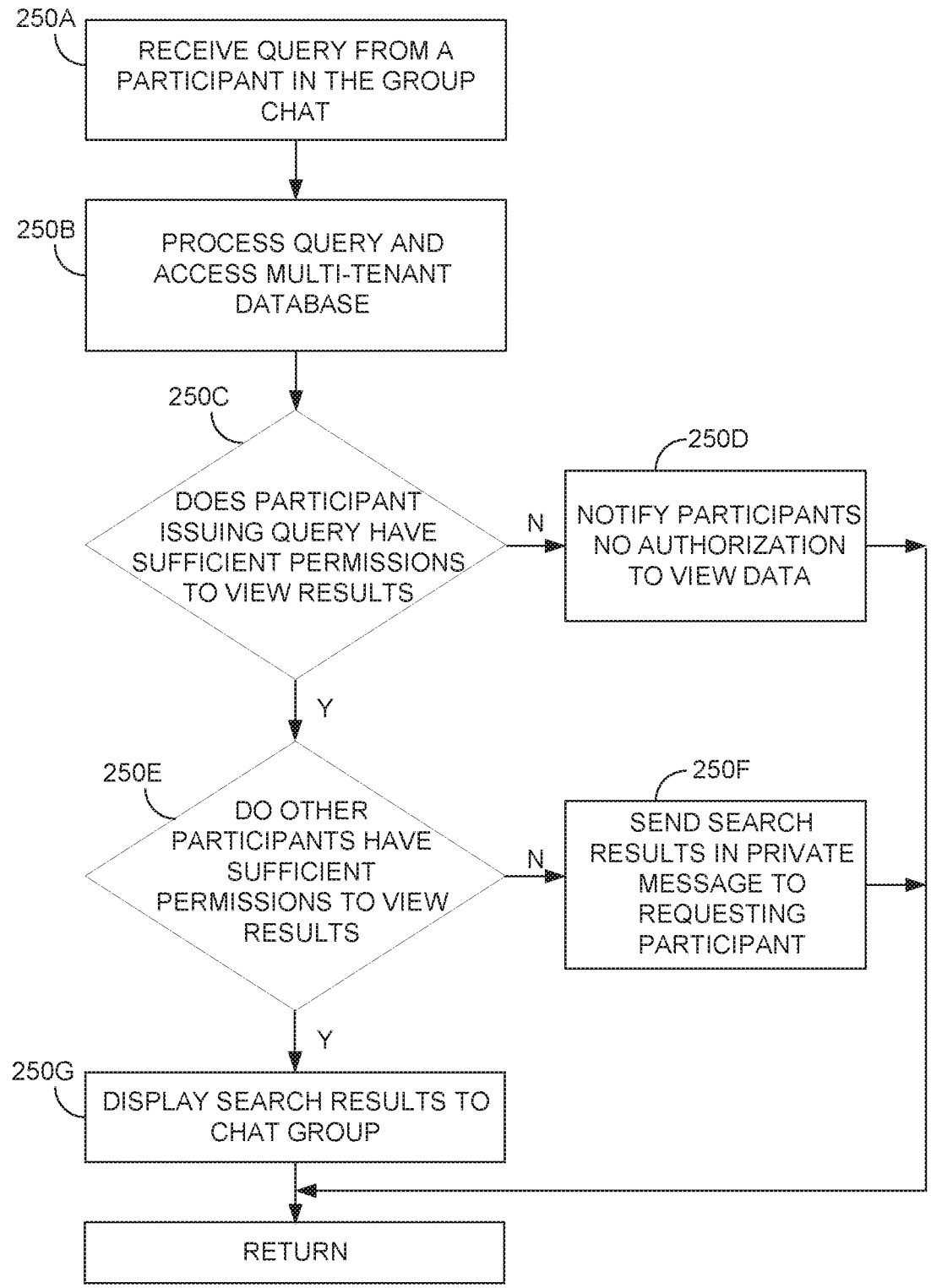
FIG. 5 shows an example process for operating a chatbot within a chat group.

FIG. 5 shows a process for using the chatbot in a chat group. In operation 250A, the chatbot receives a query from a group chat session. For example, during a group chat session, one of the participants may submit a natural language query via a messaging service asking the chatbot for sales data on a particular customer. In operation 250B, the chatbot converts the natural language query into a structured database query and submits the structured query to the multi-tenant database system.

The chatbot in operation 250C determines if the participant issuing the query has sufficient authorization to view the query results. Either during a preliminary search, or after receiving final search results, the chatbot may compare user permissions with security levels assigned to the query content. For example, some content may be assigned a security level that allows viewing and/or editing by a sales person or a sales manager. Other content may be assigned a higher security level that only allows viewing and/or editing by the sales manager. If the requesting participant has insufficient permissions, the chatbot in operation 250D sends a notification of the insufficient authorization to view the requested data.

If the requesting participant has sufficient permissions in operation 250C, the chatbot in operation 250E determines if the other participants have sufficient permissions to view the search results. For example, the chatbot compares the permissions for all of the other chat group participants with the authorization levels assigned to the search results. If the other participants have insufficient authorization, the chatbot in operation 250F may only send the search results to the requesting participant. For example, the chatbot may send the search results in a private email or private chat message to the requesting participant. If all permissions are sufficient, the chatbot in operation 250G displays search results to all chat group participants.

Figure 6:
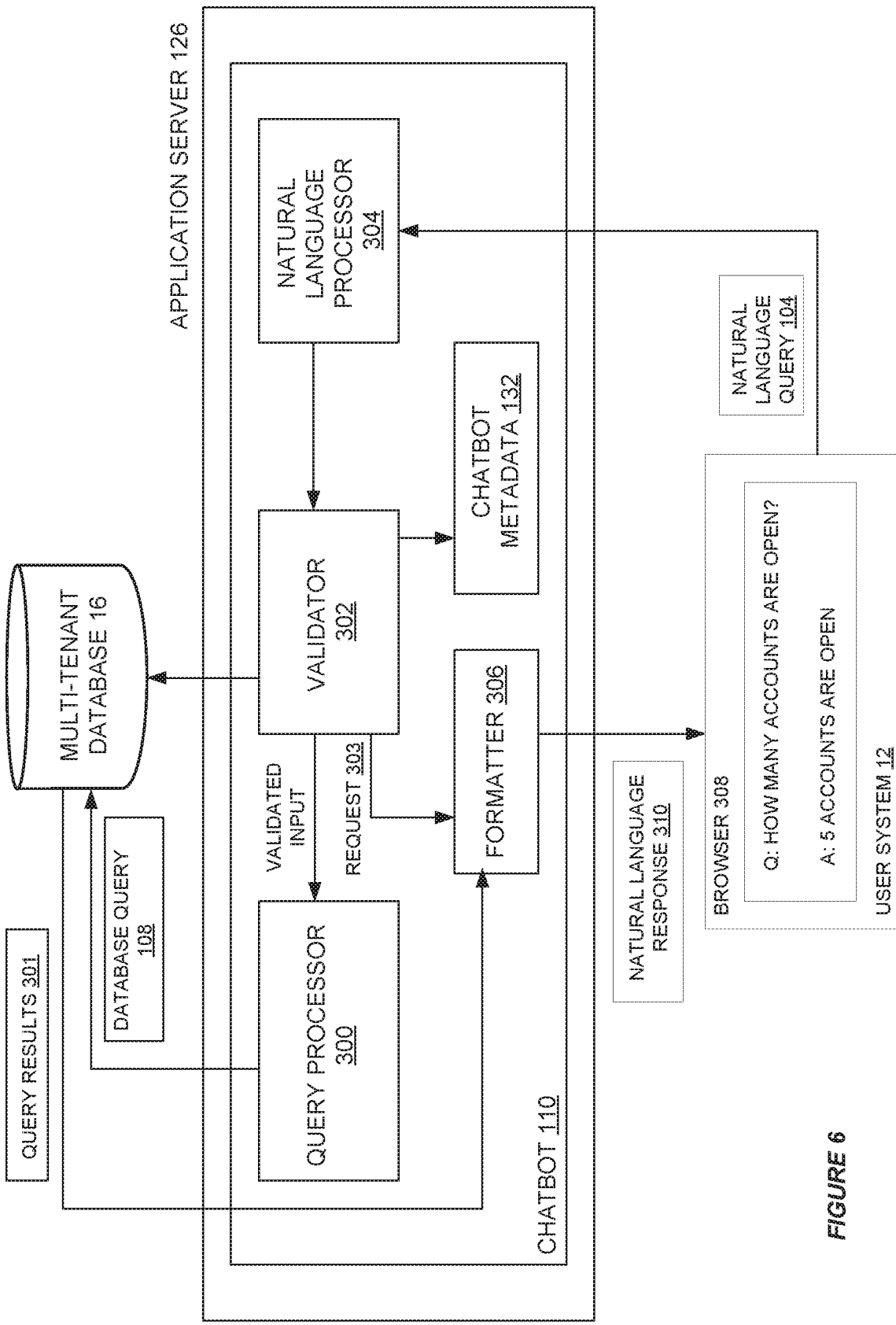
FIG. 6 shows an example chatbot database platform.

FIG. 6 shows an example chatbot platform. In one example chatbot 110 may operate on application server 126 as described above in FIG. 3. Chatbot 110 may include a natural language processor 304 that parses natural language text commonly used in person-to-person communications. Processor 304 may identify a grammatical sentence structure in natural language query 104 and identify keywords and a context for specific phrases within query 104 based on the sentence structure. Natural language processors 304 are known to those skilled in the art and are therefore not described in further detail. As mentioned above, the natural language processor 304 also may convert audio signals into text and then process the converted text.

A validator 302 may receive the parsed data from natural language processor 304 and identify datasets in database 16 associated with query 104. Validator 302 also may determine if the user has sufficient permissions to view the identified data. If datasets cannot be identified in database 16 for query 104, validator 302 may send a request 303 back to user system 102 for additional information. A formatter 306 may convert request 303 into a natural language format for displaying on user system 12.

Validator 302 may access metadata 132 to resolve ambiguities in query 104. For example, validator 302 may use metadata 132 to associate predicate phrases in query 104 with table columns. In another example, validator 302 may use metadata 132 to associate particular query keywords in query 104 with table columns or logical operations.

Query processor 300 submits structured database query or action 108 to multi-tenant database 16 and formatter 306 may receive back database results 301. Formatter 306 then may convert query results 301 into a natural language response 310 that user system 12 displays in web browser 308.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be

What is claimed is:

1. A method for operating a chatbot in a multi-tenant database, comprising:
storing, in a memory of the multi-tenant database, metadata associating natural language sentence structures with structured data in the multi-tenant database, including different tables, columns, datasets, or database query functions, the multi-tenant database being shared by one or more customers or tenants;
configuring, by a processor, behind a database firewall of the multi-tenant database, the chatbot with access to the structured data and other datasets without requiring use of an application programming interface;
responsive to the chatbot receiving a natural language query from a user:
identifying, by the chatbot, an organization in the multi-tenant database associated with the user submitting the natural language query;
identifying, by the chatbot, the datasets in the multi-tenant database associated with the organization;
converting, by the chatbot, the natural language query into a structured database query based on the metadata to access the datasets in the multi-tenant database associated with the organization;
determining, by the chatbot, based on natural language processing if the natural language query contains sufficient information to construct a structured database query by performing a preliminary search to identify the datasets in the multi-tenant database corresponding with the natural language query;
responsive to finding no matching datasets:
sending, by the chatbot, a first natural language response requesting additional information from the user; and
updating, by the chatbot, the structured database query with the additional information received from the user; submitting, by the chatbot, the structured database query to the multi-tenant database; and
converting query results into a second natural language response and sending the converted query results to the user.

2. The method of claim 1, further comprising:
identifying, by the chatbot, permissions assigned to the user;
identifying, by the chatbot, authorization levels for the datasets accessed by the structured database query; and
sending, by chatbot, results of the structured database query to the user when the permissions satisfy the authorization levels for the datasets.

3. The method of claim 1, further comprising:
identifying, by the chatbot, a network address associated with the user; and
identifying, by the chatbot, the organization in the multi-tenant database associated with the user based on the network address.

4. The method of claim 1, further comprising:
identifying, by the chatbot, keywords in the natural language query that do not match fields in the datasets;
using, by the chatbot, the metadata to map the keywords to the fields in the datasets; and
generating, by the chatbot, the structured database query to reference the fields mapped to the keywords.

5. The method of claim 1, further comprising:
associating a table with a predicate field in the metadata;
identifying, by the chatbot, a first phase in the natural language query associated with the table;
identifying, by the chatbot, a second phase in the natural language query including a predicate for the first phrase; and
generating, by the chatbot, the structured database query to map the second phrase to the predicate field identified in the metadata.

6. The method of claim 1, further comprising:
identifying, by the chatbot, a phase in the natural language query associated with a numerical operation; and
generating, by the chatbot, the structured database query to return a numeric result based on the numerical operation.

7. The method of claim 1, further comprising:
detecting, by the chatbot, an error accessing the multi-tenant database; and
generating, by the chatbot, a natural language notification reporting the error accessing the multi-tenant database.

8. The method of claim 1, further comprising:
performing, by the chatbot, an additional search in an additional database system based on the natural language query; and
combining, by the chatbot, results from the structured database query of the multi-tenant database with results from the additional search into a natural language response.

9. The method of claim 1, wherein the structured database query reads data from the multi-tenant database, modifies data in multi-tenant database, or writes data to the multi-tenant database.

10. A system for operating a chatbot in a multi-tenant database, comprising:
a hardware processor; and
a memory to store metadata associating different natural language sentence structures with structured data in respective databases of one or more organizations in the multi-tenant database, including different tables, columns, datasets, or database query functions, the multi-tenant database being shared by one or more customers or tenants, the memory further storing one or more stored sequences of instructions which, when executed by the processor, cause the processor to:
configure behind a database firewall, the chatbot with access to the structured data and other datasets without requiring use of an application programming interface;
responsive to the chatbot receiving a natural language query from a user:
identify, by the chatbot, an organization in the multi-tenant database associated with the user submitting the natural language query;
identify, by the chatbot, datasets in the multi-tenant database associated with the organization;
convert, by the chatbot, the natural language query into a structured database query based on the metadata to access the datasets in the multi-tenant database associated with the organization;
determine, by the chatbot, based on natural language processing if the natural language query contains sufficient information to construct a structured database query by performing a preliminary search to identify the datasets in the multi-tenant database corresponding with the natural language query;
responsive to finding no matching datasets:
send by the chatbot, a first natural language response requesting additional information from the user; and update, by the chatbot, the structured database query with the additional information received from the user;

submit, by the chatbot, the structured database query to the multi-tenant database; and convert query results into a second natural language response and sending the converted query results to the user.

11. The system of claim 10, wherein the instructions further cause the processor to:

identify, by the chatbot, permissions assigned to the user;

identify, by the chatbot, authorization levels for the datasets accessed by the structured database query; and send, by the chatbot, results of the structured database query to the user when the permissions satisfy the authorization levels for the datasets.

12. The system of claim 10, wherein the instructions further cause the processor to:

identify, by the chatbot, a network address associated with the user; and identify, by the chatbot, the organization in the multi-tenant database associated with the user based on the network address.

13. The system of claim 10, wherein the instructions further cause the processor to:

identify, by the chatbot, keywords in the natural language query that do not match fields in the datasets;

use, by the chatbot, the metadata to map the keywords to the fields in the datasets; and generate, by the chatbot, the structured database query to reference the fields mapped to the keywords.

14. The system of claim 10, wherein the instructions further cause the processor to:

associate a table with a predicate field in the metadata;

identify, by the chatbot, a first phase in the natural language query associated with the table;

identify, by the chatbot, a second phase in the natural language query including a predicate for the first phrase; and generate, by the chatbot, the structured database query to map the second phrase to the predicate field identified in the metadata.

15. The system of claim 10, wherein the instructions further cause the processor to:

identify, by the chatbot, a phase in the natural language query associated with a numerical operation; and generate, by the chatbot, the structured database query to return a numeric result based on the numerical operation.

16. The system of claim 10, wherein the instructions further cause the processor to:

detect, by the chatbot, an error accessing the multi-tenant database; and generate, by the chatbot, a natural language notification reporting the error accessing the multi-tenant database.

17. The system of claim 10, wherein the instructions further cause the processor to:

perform, by the chatbot, an additional search in an additional database system based on the natural language query; and combine, by the chatbot, results from the structured database query of the multi-tenant database with results from the additional search into a natural language response.

18. The system of claim 10, wherein the instructions further cause the structured database query to read data from the multi-tenant database, modify data in multi-tenant database, or write data to the multi-tenant database.

19. A non-transitory computer-readable medium containing program instructions operating a chatbot in a multi-tenant database that, when executed by one or more processors, cause the one or more processors to carry out the steps of:

storing, in a memory of the multi-tenant database, metadata associating natural language sentence structures with structured data in the multi-tenant database, including different tables, columns, datasets, or database query functions, the multi-tenant database being shared by one or more customers or tenants;

configuring, by a processor, behind a database firewall of the multitenant database, the chatbot with access to the structured data and other datasets without requiring use of an application programming interface;

responsive to the chatbot receiving a natural language query from a user:

identifying, by the chatbot, an organization in the multi-tenant database associated with the user submitting the natural language query;

identifying, by the chatbot, datasets in the multi-tenant database associated with the organization;

converting, by the chatbot, the natural language query into a structured database query based on the metadata to access the datasets in the multi-tenant database associated with the organization;

determining, by the chatbot, based on natural language processing if the natural language query contains sufficient information to construct a structured database query by performing a preliminary search to identify the datasets in the multi-tenant database corresponding with the natural language query;

responsive to finding no matching datasets:

sending, by the chatbot, a first natural language response requesting additional information from the user; and updating, by the chatbot, the structured database query with the additional information received from the user;

submitting, by the chatbot, the structured database query to the multi-tenant database; and converting query results into a second natural language response and sending the converted query results to the user.

20. The computer-readable medium of claim 19, further including program instructions for:

identifying, by the chatbot, permissions assigned to the user;

identifying, by the chatbot, authorization levels for the datasets accessed by the structured database query; and sending, by natural language processor, results of the structured database query to the user when the permissions satisfy the authorization levels for the datasets.

21. The computer-readable medium of claim 19, further including program instructions for:

performing, by the chatbot, a preliminary search in the multi-tenant database based on the natural language query;

determining, by the chatbot, sufficiency of the natural language query for generating the structured database query based on the preliminary search;

generating, by the chatbot, a natural language request for additional user input when the natural language query is insufficient for generating the structured database query;

receiving, by the chatbot, an additional natural language input from the user; and using, by the chatbot, the additional natural language input to construct the structured database query.

22. The computer-readable medium of claim 19, further including program instructions for:

identifying, by the chatbot, a network address associated with the user; and identifying, by the chatbot, the organization in the multi-tenant database associated with the user based on the network address.

23. The computer-readable medium of claim 19, further including program instructions for:

identifying, by the chatbot, keywords in the natural language query that do not match fields in the datasets;

using, by the chatbot, the metadata to map the keywords to the fields in the datasets; and generating, by the chatbot, the structured database query to reference the fields mapped to the keywords.

\* \* \* \* \*